(12) United States Patent
Sheffler

(10) Patent No.: US 9,813,746 B2
(45) Date of Patent: Nov. 7, 2017

(54) NETWORK-LOSS TOLERANT MOBILE BROADCAST SYSTEMS AND ALGORITHMS

(71) Applicant: Thomas J. Sheffler, San Francisco, CA (US)

(72) Inventor: Thomas J. Sheffler, San Francisco, CA (US)

( * ) Notice: Subject to any disclaimer, the term of this patent is extended or adjusted under 35 U.S.C. 154(b) by 0 days.

(21) Appl. No.: 15/271,223

(22) Filed: Sep. 20, 2016

(65) Prior Publication Data

US 2017/0085936 A1    Mar. 23, 2017

Related U.S. Application Data

(60) Provisional application No. 62/221,296, filed on Sep. 21, 2015.

(51) Int. Cl.
| | |
|---|---|
| H04N 21/262 | (2011.01) |
| H04L 29/08 | (2006.01) |
| H04N 21/414 | (2011.01) |
| H04N 21/234 | (2011.01) |
| H04N 21/4223 | (2011.01) |
| H04N 21/643 | (2011.01) |
| H04N 21/845 | (2011.01) |
| H04L 12/801 | (2013.01) |

(52) U.S. Cl.
CPC ....... *H04N 21/26258* (2013.01); *H04L 47/34* (2013.01); *H04L 67/02* (2013.01); *H04L 67/2804* (2013.01); *H04N 21/23406* (2013.01); *H04N 21/41407* (2013.01); *H04N 21/4223* (2013.01); *H04N 21/64322* (2013.01); *H04N 21/8456* (2013.01)

(58) Field of Classification Search
CPC .. H04N 9/79; H04N 21/231; H04N 21/23418; H04N 21/23892; H04N 21/8456; H04N 21/85406; H04N 21/8547; H04N 5/77
See application file for complete search history.

(56) References Cited

U.S. PATENT DOCUMENTS

2014/0010517 A1\*  1/2014  Sheffler .................... H04N 9/79
                                                            386/226

\* cited by examiner

*Primary Examiner* — Chenea Smith
(74) *Attorney, Agent, or Firm* — WHS Law Firm

(57) ABSTRACT

Systems and Algorithms for a network-loss tolerant, mobile broadcasting system that reliably and efficiently address unreliable or untimely transmission of segments. By associating a unique metadata to each segment (an Upload ID), segments are identified by the order in which they were captured at their source. Upload IDs allow for methods to proactively address lost or out-of-order segments without disturbing a broadcast. Late arriving segments are preserved for broadcast in the correct sequence by the invention's novel uses of Upload IDs.

2 Claims, 9 Drawing Sheets

Handling Out-of-Order or Lost Segments

Figure 1:
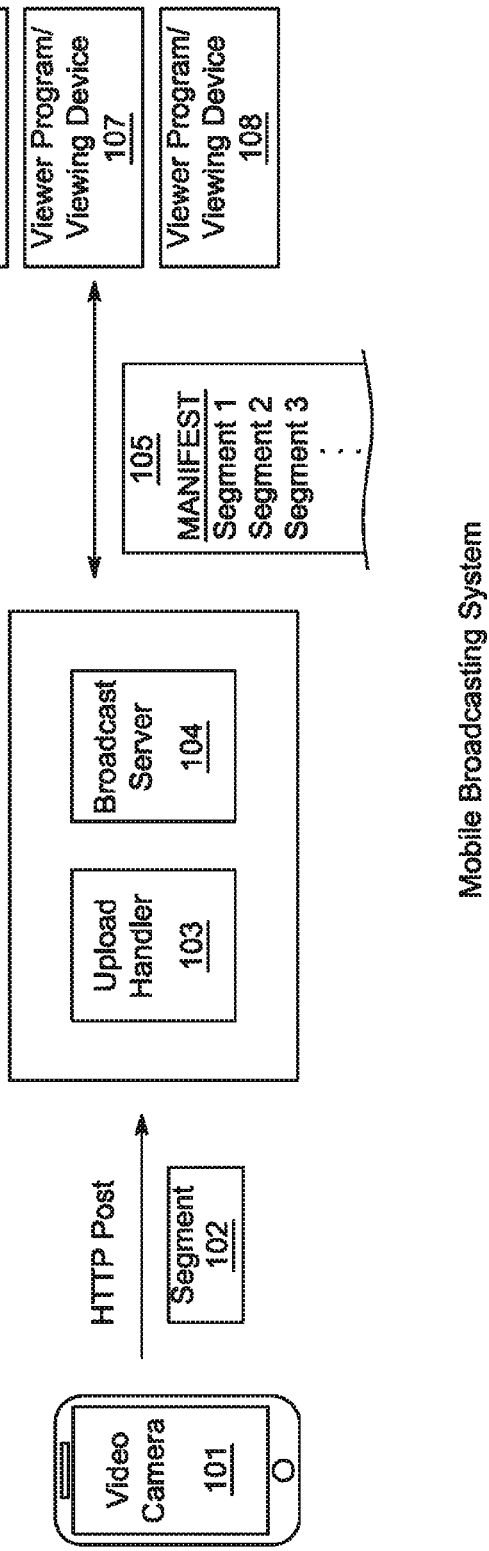

Network-Loss Tolerant Mobile Broadcasting System Using HLS

Mobile Broadcasting System Using a Reordering Buffer

NETWORK-LOSS TOLERANT MOBILE BROADCAST SYSTEMS AND ALGORITHMS

CROSS-REFERENCE TO RELATED APPLICATIONS

This application claims priority to U.S. Provisional Application No. 62/221,296 filed Sep. 21, 2015. The content of the above application is incorporated by reference in its entirety.

FIELD OF THE DISCLOSURE

The present invention relates to the management of multimedia content, in particular, to systems and algorithms for improving the viewing experience in mobile broadcasting system.

BACKGROUND

Mobile devices with high quality cameras and microphones, such as mobile phones, now have enough processing power and network connectivity that they can be used as effective live, real-time video broadcasters. Indeed, live mobile broadcasting has become a popular activity and numerous companies are exploring how to commercialize applications that allow people to share live video.

Broadcasting video over networks generally, and live video in particular, presents various issues that impact delivery of a high quality viewing experience. These issues include adapting to multiple networks and their differing and/or changing characteristics, addressing end-to-end delays in delivering video streams (latency), and—pertinent to the present invention—"lossy" networks. Lossy networks are networks that fail to provide reliable and timely transmission of data.

As a result, adaptive streaming technologies have been developed that use segmentation of video, including those based on the standard Hypertext Transfer Protocol (HTTP), e.g., Apple, Inc.'s HLS Live Streaming (HLS), Adobe Systems, Inc.'s HTTP Dynamic Streaming, Microsoft Corp.'s SmoothStreaming, and Moving Pictures Experts Group's Dynamic Adaptive Streaming over HTTP. Video streams are reformatted to adapt to unique and varying requirements of individual networks and/or viewing platforms. Video segments are containers in a format suitable for the transmission of video. Segments enable adaptive streaming. Segments are also particularly useful where transmission is not guaranteed reliable (lossy networks).

These adaptive streaming technologies use manifests to provide information regarding the transmitted video segments, and the location of the segments in the order in which they should be played. Manifests can, e.g., indicate that the next video segment to be played differs in form from the previous segment played. These indicators, such as the HLS tag #EXT-X-Discontinuity, are commonly used to insert commercials into a video stream. In such a case, the clock reference and timestamps of the two video sources will likely not match. For streaming live video, manifests are constructed in such a way that the manifest can be dynamically updated (a "live playlist")—old segment locations are deleted and new ones are added. When acting as live playlists, manifests do not end. The manifest acts like a "sliding window." If segments and manifests are constructed correctly, a viewer program can play the segments smoothly, resulting in a pseudo-live video presentation.

However, networks can frequently be unreliable or untimely in their transmission of data. These lossy networks lose segments and deliver segments out of order. When this occurs, the pseudo-live video presentation can be interfered with, interrupted, or even stopped. What is needed, therefore, are systems and algorithms for a network-loss tolerant mobile broadcasting systems that reliably and efficiently address lost and out-of-order segments.

SUMMARY

The disclosed invention comprises Systems and Algorithms for a network-loss tolerant mobile broadcasting system that reliably and efficiently addresses lost and out-of-order segments. By associating a unique metadata to each segment (an Upload ID), segments are identified by the order they were captured and posted at their video source. The present invention also discloses methods for managing these segments using these metadata identifiers. Upload IDs ensure segments are received and broadcast in their correct sequence. With this information, lost or out-of-order segments can be detected and resolved so that broadcasting is not negatively impacted. Upload ID can also be used to rescue late arriving segments while still preventing them from interfering with the broadcast.

BRIEF DESCRIPTION OF THE DRAWINGS (TO BE COMPLETED)

The drawings described herein are for illustrative purposes only of selected embodiments and not all possible implementations and are not intended to limit the scope of the present disclosure.

FIG. 1 Block flow diagram illustrating Mobile Broadcasting System

Figure 2:
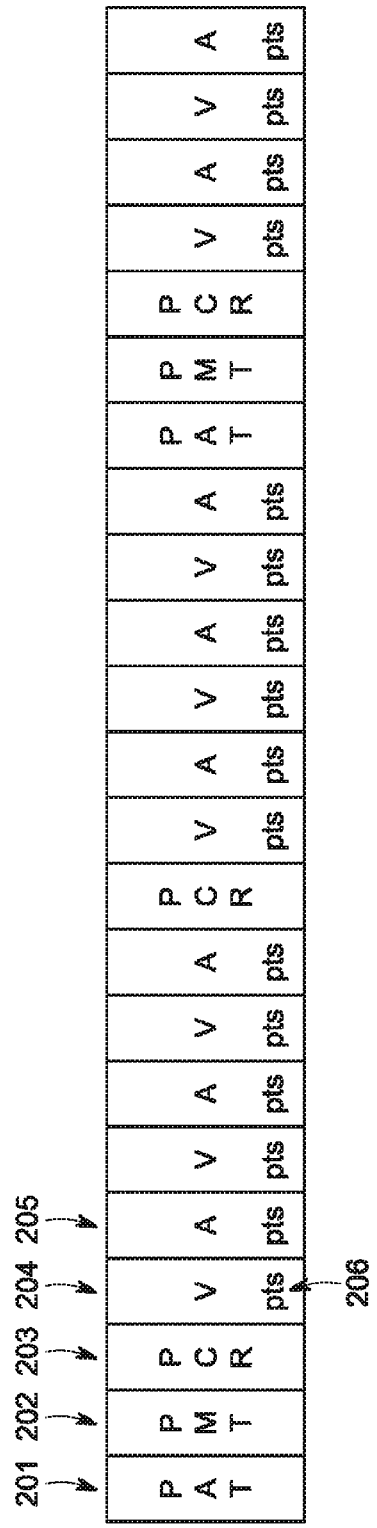

FIG. 2: Block flow diagram illustrating the format of Transport Stream.

Figure 3:
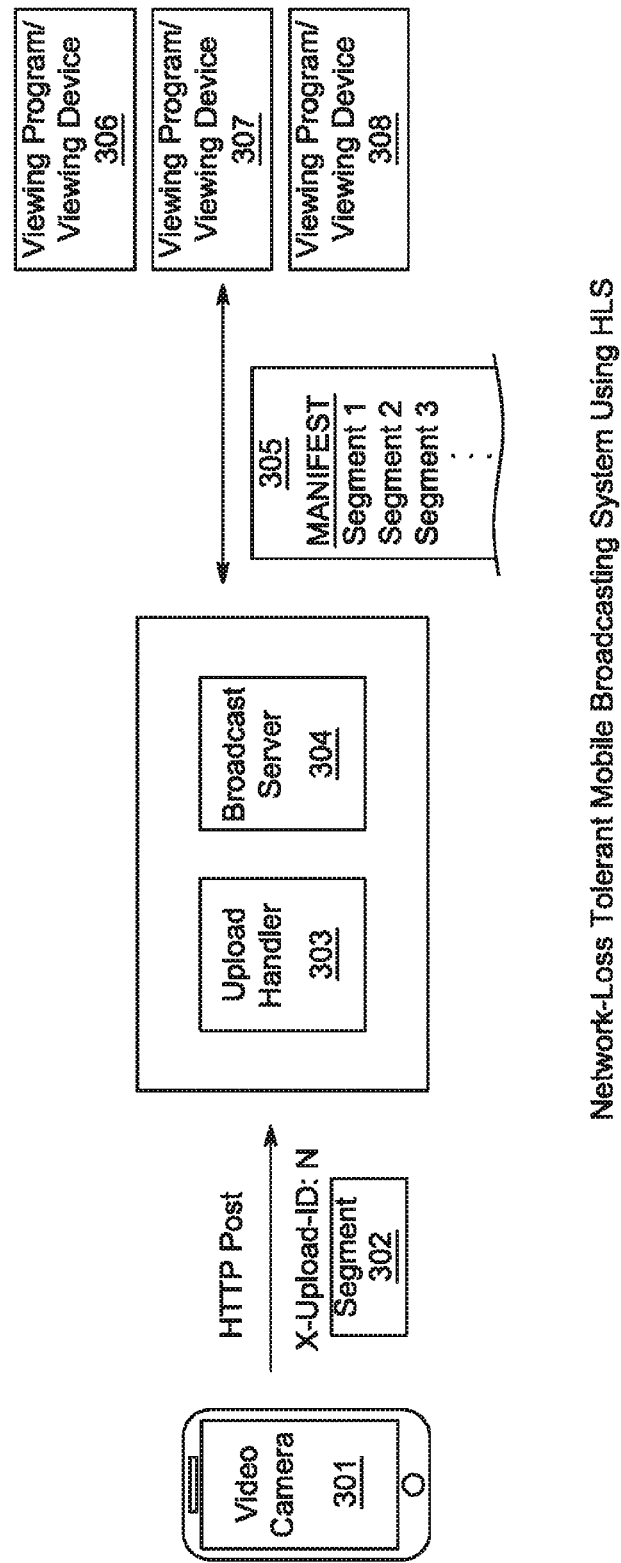

FIG. 3: Block flow diagram illustrating Network-Loss Tolerant Mobile Broadcasting System Using, in one embodiment, HLS.

Figure 4:
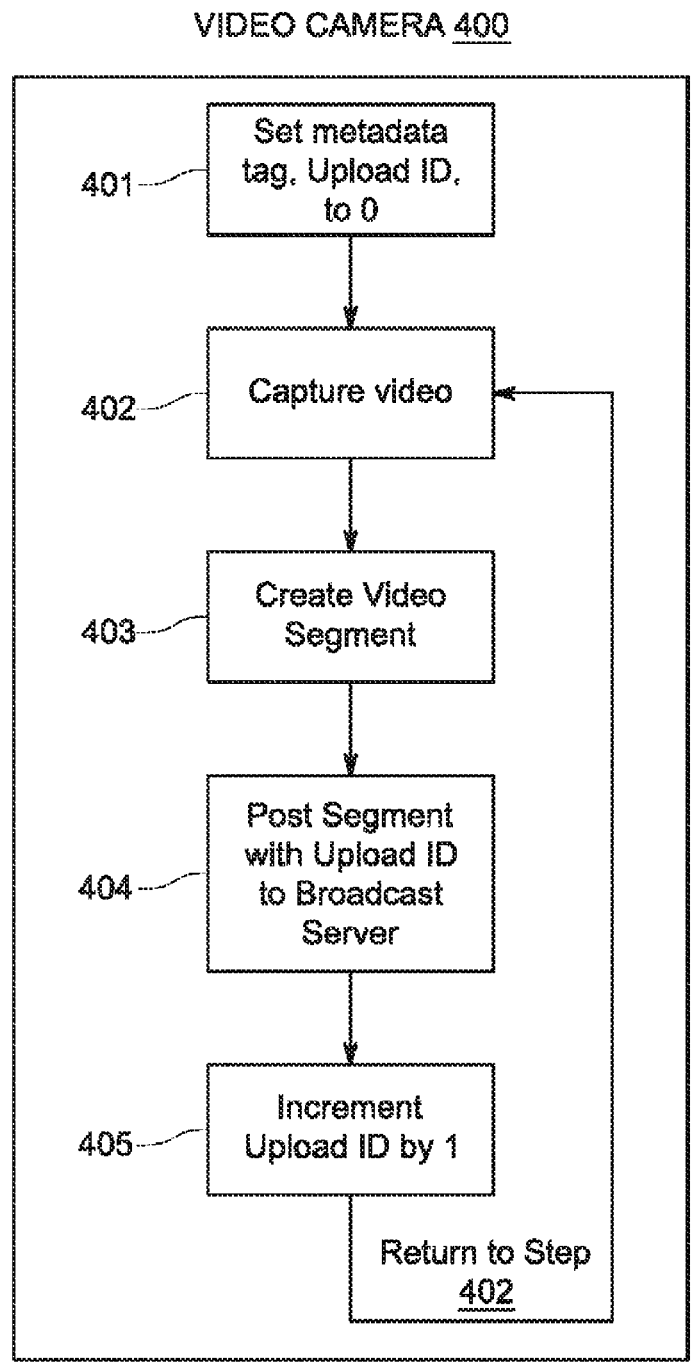

FIG. 4: Block flow diagram illustrating Creating and Posting Upload ID.

Figure 5A:
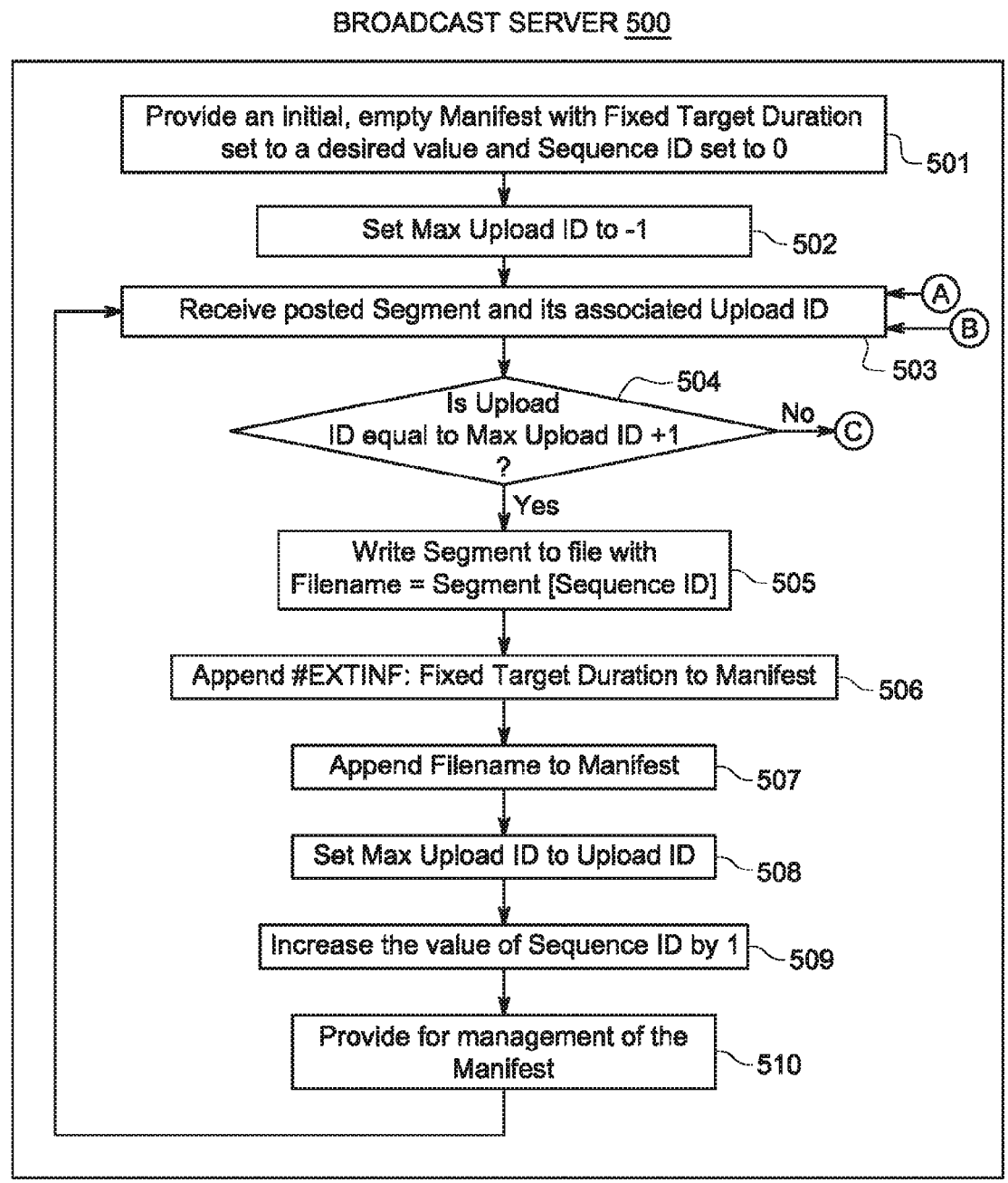

FIG. 5A: Block flow diagram illustrating Method for Handling Out-of-Order or Lost Segments.

Figure 5B:
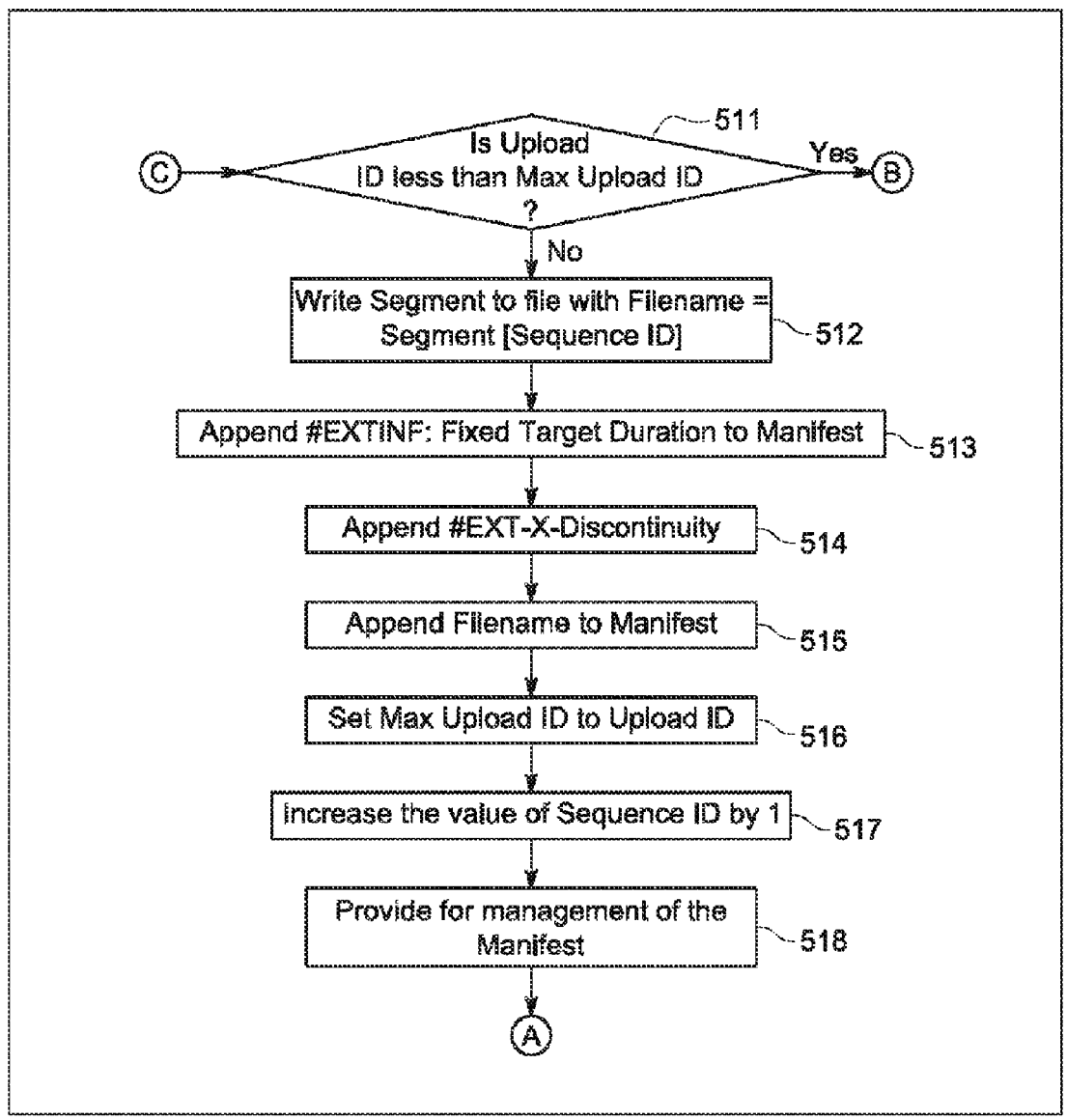

FIG. 5B: Block flow diagram further illustrating Method for Handling Out-of-Order or Lost Segments.

Figure 6:
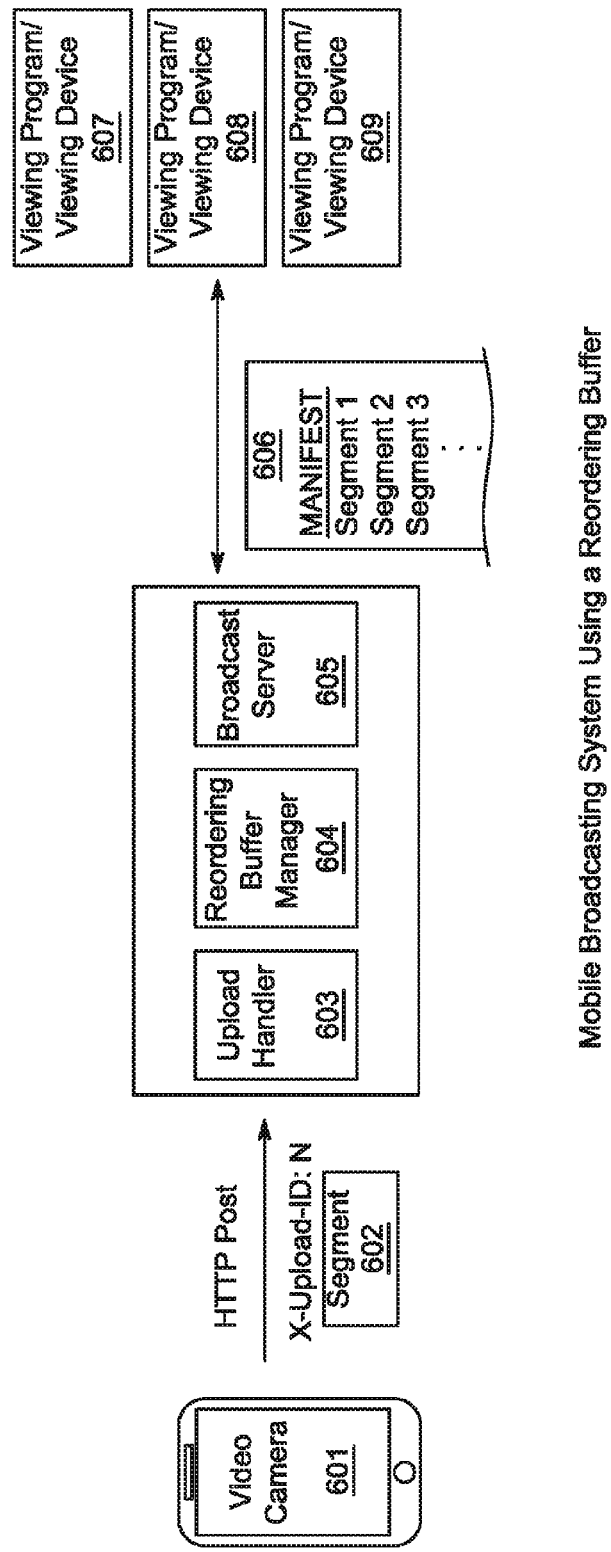

FIG. 6: Block flow diagram illustrating Mobile Broadcasting System Using a Reordering Buffer.

Figure 7:
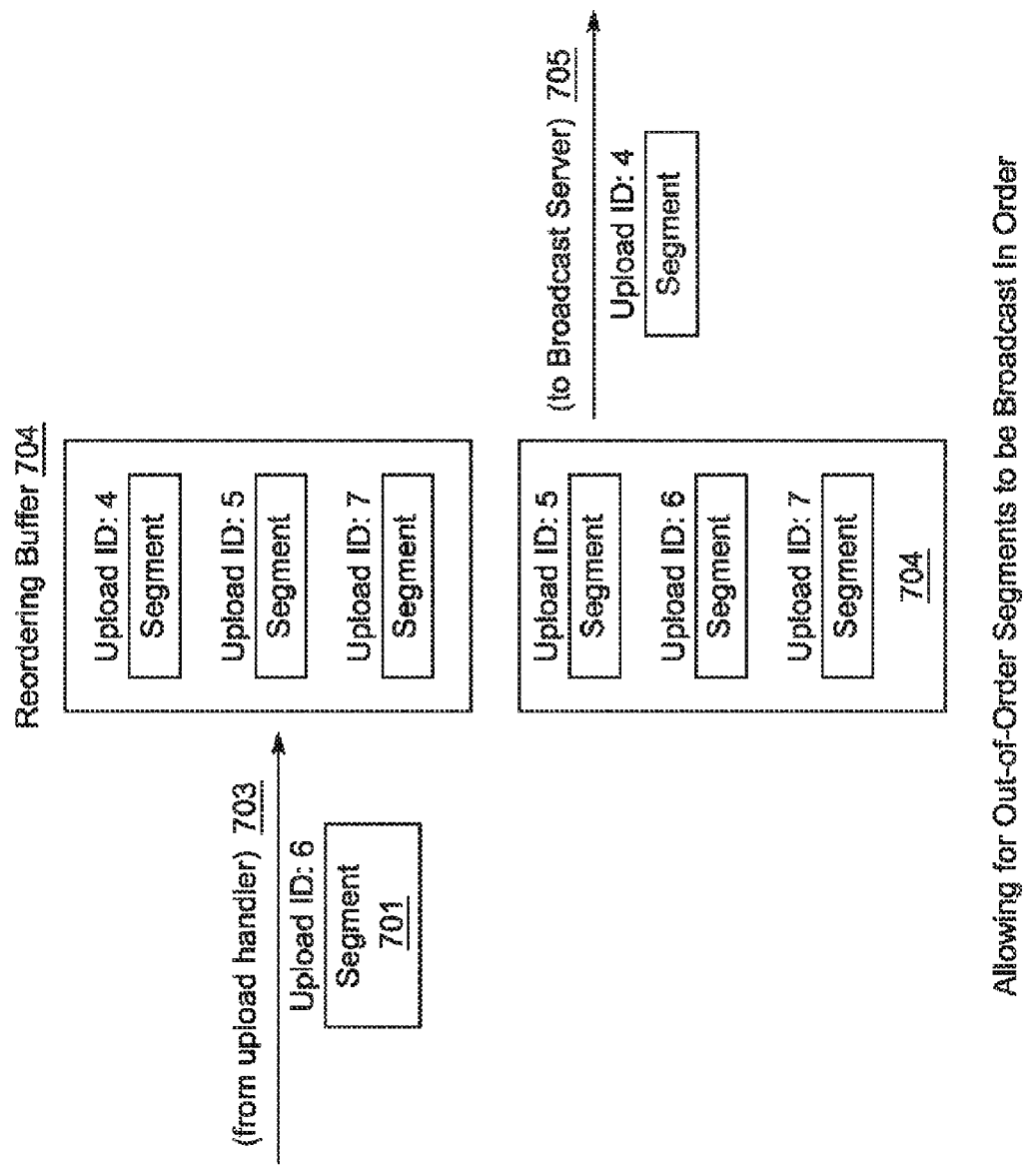

FIG. 7: Block flow diagram illustrating Method for Allowing Out-of-Order Segments to be Broadcast In Order, featuring the Management Process of the Reordering Buffer.

Figure 8:
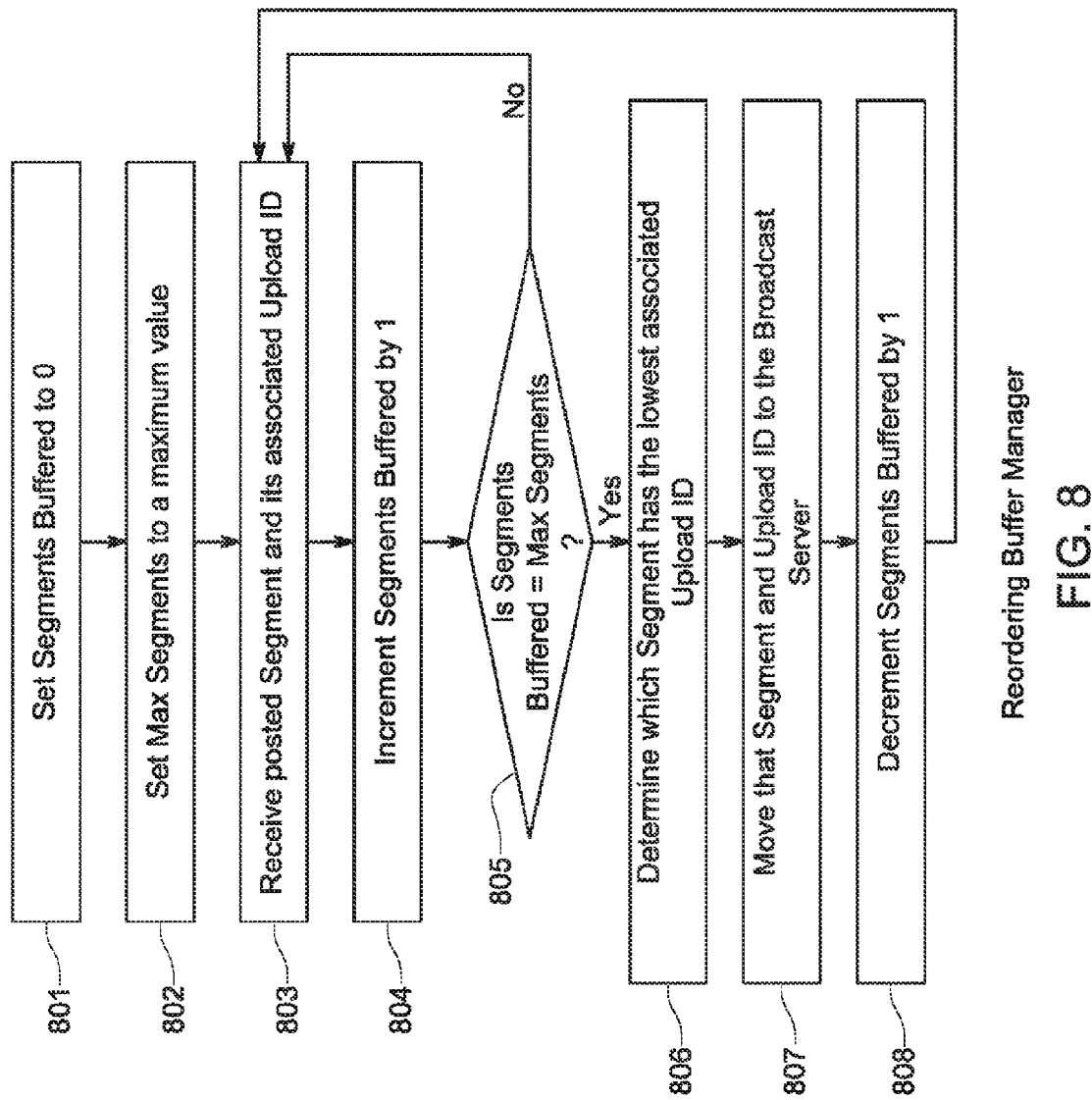

FIG. 8: Block flow diagram illustrating the Management Process of the Reordering Buffer Manager.

DEFINITIONS

Audio, "A": element of segments encoded in transport stream format that contains audio data.

Broadcast module: module that generates segment playlists.

Broadcast Server: module that generates segment playlists.

Buffer: storage used to temporarily to data while it is transferred.

Filename: name of data file which provides information suitable to access that data file, such as a universal resource locator ("url").

Fixed Target Duration: parameter that is used to indicate the desired duration in time for a segment.

Hypertext Transfer Protocol, "HTTP": messaging protocol related to transmitting data over a network.

HTTP Post: message that requests data enclosed in the body of the message be accepted and stored.

Identifier: information that identifies a segment.

Lost segment: segment that was transmitted but never received by the intended recipient.

Manifest: data containing information regarding segments, including the identification of segments and the order in which the segments should be selected and/or presented.

Max Segments: parameter that indicates the maximum number of segments that may be stored in a buffer.

Max Upload ID: parameter that indicates the highest Upload ID received.

Mobile broadcasting system: system for the transmission and receipt of video over networks.

Out-of-order segment: segment that is received out of the order in which that segment was created in relation to other segments.

Out-of-order tag: metadata that indicates that a particular segment is an out-of-order segment.

Program Association Table, "PAT": element of segments encoded in transport stream format that lists all available programs related to the transport stream.

Program Clock Reference, "PCR": element of segments encoded in transport stream format that contains time information to allow for synchronization of the transport stream's audio and video content.

Program Map Table, "PMT": element of segments encoded in transport stream format that describes the transport stream's audio and video content to a program.

Post: HTTP message that requests data enclosed in the body of the message be accepted and stored.

Presentation Time Stamp, "pts": element of segments encoded in transport stream format that contains time information for segments' audio and video content, which is used for synchronization relative to a PCR.

Reordering Buffer Manager: module that provides for out-of-order segments to be transmitted or transferred in their intended order.

Reordering Buffer: storage that contains segments and their associated Upload IDs.

Segment [n]: information that identifies segments.

Segment: portion of video data that is in a format suitable for transmission.

Segments Buffered: parameter that indicates the number of segments stored in a buffer.

Sequence ID, "seqID": parameter, which is in HTTP Live Streaming format, that indicates that a segment's sequence relative to that segment's position in a manifest.

Segment playlist: data containing information regarding segments, including the identification of segments and the order in which the segments should be selected and/or presented.

Tag: label attaching information or data that usually helps describe an item, information or data.

Upload Handler: module that receives segments and transfers or transmits segments.

Upload ID: metadata generated by a video camera that communicates the sequence in which a segment was created.

Video, "V": element of segments encoded in transport stream format that contains video data.

Video Camera: general term for all devices that capture video and all devices that transmit video over networks.

Video Segment: portion of video data in a format suitable for transmission

Viewer Program: module that accesses and presents segments.

Viewing module: module that accesses and presents segments.

Viewing Device: device that contains viewer programs or accesses viewer programs.

X-Upload-ID: N: new HTTP Post header tag that provides a value, "N", for the Upload-ID associated with the segment contained in the post.

EXT-X-Discontinuity: indicator, which is in HTTP Live Streaming format, that indicates that the next referenced segment differs in form from the previously referenced segment.

EXTINF: indicator, which is in HTTP Live Streaming format, that indicates a segment's filename follows it.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," "program," "device," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. §112 ¶ 6. Specifically, the use of "step of" in the claims herein is not intended to invoke the provisions of U.S.C. §112 ¶ 6.

FIG. 1 depicts, as an embodiment, a system for mobile broadcasting. A Video Camera 101 captures a video stream, creates a video Segment 102 and transmits the Segment 102, via an HTTP Post, to an Upload Handler 103. The Upload Handler 103 passes segments to a Broadcast Server 104, which creates and maintains a Manifest 105. The Manifest 105 contains information regarding segments, and the location of segments (Segment 1, Segment 2, Segment 3, . . . ) in the order to be presented by viewer programs accessed by viewing devices 106-108.

Timing is critical to broadcasting pseudo-live, segmented video streams. Time is therefore fundamental to the present invention, as well as to the file format used for video segments in embodiments of the present invention. Transport stream is one such format.

FIG. 2 illustrates the following notable elements of a transport stream in several embodiments:

Program Association Table (PAT) 201 lists all available programs in the stream;
Program Map Table (PMT) 202 describes the streams audio and video for a program;
Program Clock Reference (PCR) 203 provides for synchronization of stream content;
Video (V) 204 provides video content in, e.g., a video packet in h. 264 format;
Audio (A) 205 provides audio content in, e.g., an audio packet in AAC format; and
Presentation Time Stamp (PTS) 206—is a time stamp for each video and audio frame that is used for synchronization relative to a PCR.

Segments are combined by the viewer software so that the resulting playback is smooth (i.e., the playback does not halt), and there are no visible or audible gaps between the media files. To achieve this effectively in the transport stream format example, the segments must present a smoothly and steadily increasing PCR 203, and monotonically not-decreasing PTSs 206. Specifically, a series of audio and video packets may not have PTSs 206 that decrease in value. If these constraints are not met, a viewer program may stall or may completely halt because the program determines that the video stream is corrupted.

Networks can frequently be unreliable or untimely in their transmission of data, resulting in lost or out-of-order segments. Indeed, referring back to FIG. 1, even an individual Video Camera's 101 consecutive posts of Segments 102 to an Upload Handler 103 may arrive out of order, and some Segments 102 may never arrive.

In some mobile broadcasting systems, video cameras not only create the segments, they create manifests as well. Those systems are similarly impacted by lossy networks. The manifest may not arrive, or the segment information in the manifest may be made inaccurate by lost or out-of-order segments as depicted in FIGS. 1 and 3.

By way of further example for context, Apple™ Inc.'s iOS™ batches multiple application's pending HTTP requests (like HTTP posts) and performs them concurrently. This technique improves efficiencies and maximizes a device's bandwidth. However, it has the effect of introducing additional indeterminism into the time posts will be completed. What this means is that, due to the nature of the operating system itself, HTTP posts are not guaranteed to arrive at their destination in any particular order.

Time stamps associated with segments, shown in FIG. 2's PCR 203 and PTS 206, cannot be used to effectively address out-of-order or lost segments. The first reason is uncertainty. One might extract and compare the last PTS value of the last segment received by a broadcast server (PTS1_End) to the extracted value of the first PTS of the next segment received (PTS2_Start). If the difference (PTS2_Start-PTS1_End) is smaller than a predetermined 'delta', then the broadcast server might decide that the two segments were indeed captured and posted consecutively by a video camera. Care would need to be taken in choosing an appropriate value of 'delta'. It is possible that choosing a value of 'delta' slightly too small would mistakenly determine that a segment is lost. Choosing a value too large might result in two non-consecutive segments to be considered consecutive.

The second reason is cost. There is unnecessary computational complexity involved in parsing the segments to extract PCR and PTS values.

Referring to FIG. 3, one embodiment of the invention using HLS is shown. This embodiment of the present invention splits the tasks of creating a Segment 302 and generating the Manifest 305 between the Video Camera 301 and the Broadcast Server 304. As each segment 302 is created by the Video Camera 301, the Video Camera 301 posts using HTTP the Segment 302 to the Upload Handler 303 with additional information pertinent to broadcasting the Segment 302. As will be discussed further below, the present invention introduces new information to be posted with a Segment 302, its Upload ID.

In the HLS format example, the value of an Upload ID ("N") would be communicated via a new HTTP POST header tag ("X-Upload-ID:"), which would be formatted in the following way: "X-Upload-ID: N". The Broadcast Server 304 will use Upload IDs along with the other posted information to generate a Manifest 305 that describes a live media stream (Segment 1, Segment 2, Segment 3, . . . ) to Viewing Programs accessed by Viewing Devices 306-308.

Referring to FIG. 4, the steps of one embodiment of one aspect of the invention are shown. Video Camera 400 sets a new metadata tag, Upload ID, to an initial value of zero 401. Video Camera 400 continuously captures video 402, creates video segments 403 with steadily increasing PCR values from that captured video, posts individual segments with their associated Upload IDs ("N") in a new HTTP POST header (X-Upload-ID: N) to the Broadcast Server 404 via the Upload Handler, and increments the Upload ID by one 405.

Segments are therefore identified by the order they were captured and posted at the video source 400. Upload IDs and their association with segments provide a reliable and efficient means to ensure segments are received and broadcast in their correct sequence. With this information, lost or out-of-order segments are detected and resolved so that viewing of the video stream is not negatively impacted.

FIG. 5A outlines and illustrates the steps of one embodiment of the present invention's algorithm to detect lost or "out-of-order" segments. Broadcast Server 500 provides for an initial, empty Manifest, sets Fixed Target Duration to a desired value for the duration in time of video segments, and sets the Sequence ID of video segments to an initial value of zero 501. The Max Upload ID parameter is also initialized to a value of negative one 502.

As each posted segment and its associated Upload ID is received 503, that Upload Id is compared to the maximum Upload ID received thus far (Max Upload ID) 504. If the newly arriving Upload Id is exactly one greater than the previous Max Upload ID, the Broadcast Server 500 is certain that this segment was the next, consecutive segment created and posted by the Video Camera. In this case, the segment is added to the end of the Manifest 505-507. Specifically, in this embodiment, the segment is written to a file with an identifier, such as a filename, which includes its location and a strictly increasing Sequence ID 505. An informational tag ("EXTINF: [Fixed Target Duration]" is appended to the end of the Manifest indicating a segment filename follows with a specified, desired duration 506. Finally, the segment's filename is appended to the end of the Manifest 507.

Once the received segment is processed, Max Upload ID is set to Upload ID 508, Sequence ID is increased by one 509, and management of the Manifest is provided 510. That is to say, e.g., if the Manifest has exceeded its sliding window size, the Manifest would be modified by deleting its first segment and that segment's associated information.

If the newly arriving Upload ID is not exactly one greater than the previous Max Upload ID 504, the Broadcast Server 500 can be certain that this segment was not the next, consecutive segment created and posted by the Video Camera. If this scenario occurs, the further steps occur as illustrated in FIG. 5B, as indicated by the circled letter "C" in FIG. 5A at 504 and FIG. 5B at 511.

Referring to FIG. 5B, if the Upload ID is less than the Max Upload ID 511, the Broadcast Server 500 is certain that this segment has arrived out of order, and that a segment created and posted later in time by the Video Camera has been appended to the Manifest. This segment now being processed must be not be appended. If it were appended to the Manifest, the viewer program would detect an inconsistent state and likely halt playback. That is because the segments in the Manifest must strictly move forward in time. In this case, the next step is to disregard the present segment and receive the next posted segment and its associated Upload ID, as indicated by the circled letter "B" in FIG. 5A at 503 and FIG. 5B at 511.

If the newly arriving Upload ID is not less than Max Upload ID (and in this case actually more than one greater than the Max Upload ID) 511, then the Broadcast Server is certain that this segment was created and posted by the Video Camera later in time than, but not consecutively with, the last segment. A consecutive segment has been lost. In this case, the segment is added to the end of the Manifest with additional information 512-515.

Specifically, in this embodiment, the segment is written to a file with a filename which includes its location and a strictly increasing Sequence ID 512. An informational tag ("EXTINF: [Fixed Target Duration]") is appended to the end of the Manifest indicating a segment filename follows with a specified, desired duration 513. An informational tag ("#EXT-X-Discontinuity") is appended to the end of the Manifest that indicates to the viewer program that there will be a discontinuity in this segment's clock reference and timestamps 514. In this way, the present invention detects lost segments and proactively inserts information that prevents issues with playback. Finally, the segment's identifier, e.g. filename, is appended to the end of the Manifest 515.

Once the received segment is processed, Max Upload ID is set to Upload ID 516. Upload ID in this case, as illustrated, was actually more than one greater than Max Upload ID. Sequence ID is increased by one 517, and management of the Manifest is provided 518. That is to say, e.g., if the Manifest has exceeded its sliding window size, the Manifest would be modified by deleting its first segment and that segment's associated information. The next step is to receive the next posted segment and its associated Upload ID, as indicated by the circled letter "A" in FIG. 5A at 503 and FIG. 5B at 518.

One embodiment of the systems and algorithms, which is based on HTTP Live Streaming and which—in this example—assumes a desired target duration for segments as the value six, works as follows:

1. Define two variables and initially set the following values:

seqId=0 (defines the current first element of the Manifest)

maxUploadlD=−1 (defines the maximum value of Upload ID accepted so far)

window=N (defines the size of the Manifest's sliding window)

2. Create an initial empty manifest file, as shown below.

EXTM3U

EXT-X-TARGETDURATION: 6

EXT-X-MEDIA-SEQUENCE: 0

3. For each upload (post) received with a segment in transport stream format ('tsdata') and a header including 'uploadId', perform the following calculation. We use the following notation ({variable}) to denote the interpolation (rendering) of the value of a variable into its surrounding text.

```
if uploadId == maxUploadId + 1:
  // in-sequence arrival
  write the tsdata to a file with FILENAME="segment{seqId}"
  seqId = seqId +1
  append the following lines to the manifest
    #EXTINF:6,
    {FILENAME}
  // set the new maximum upload id
  maxUploadId = uploadId
  if the manifest has exceeded the sliding window size (N):
    delete the first segment and any preceding tags referencing it
    set the EXT-X-MEDIA-SEQUENCE tag value to {seqId - window}
else if uploadId < maxUploadId:
  // non-increasing sequence
  // do nothing - throw the upload away
else
  // a discontinuous upload id has been observed
  write the tsdata to a file with FILENAME="segment{seqId}"
  seqId = seqId +1
  append the following lines to the manifest
    #EXTINF:6,
    #EXT-X-DISCONTINUITY
    {FILENAME}
```

-continued

```
// set the new maximum upload id
maxUploadId = uploadId
if the manifest has exceeded the sliding window size (N):
    delete the first segment and any preceding tags referencing it
    set the EXT-X-MEDIA-SEQUENCE tag value to {seqId - window}
```

Thus, as network errors cause segments to be lost or to arrive out-of-order, the present invention ensures that viewer programs do not halt playback. Information is proactively inserted in the Manifest whenever nonconsecutive timestamps jump forward in time. Segments with nonconsecutive timestamps that jump backward in time are proactively disregarded.

The present invention thereby enforces broadcast of segments in a strictly increasing sequence by, sometimes, disregarding late arriving segments. However, late arriving segments can be preserved for broadcast in the correct sequence by a novel use of the present invention's Upload ID, infra.

Referring to FIG. 6, one embodiment of the invention using a Reordering Buffer Manager 604 is shown. A network-loss tolerant mobile broadcasting system may be made more tolerant of out-of-order, specifically late arriving, segments by using a Reordering Buffer Manager 604. The Reordering Buffer Manager 604 controls a reordering buffer that is logically positioned [systematically] between the Upload Handler 603 and the Broadcast Server 604. The Reordering Buffer Manager 604 allows for segments arriving out-of-order, which would otherwise have been disregarded by the algorithm shown above, to be broadcast in the correct order.

FIG. 7 provides an illustration of how a the Reordering Buffer 704 manages segments, in one embodiment. FIG. 7 shows a first state of a Reordering Buffer 704 above, and the next state of the Reordering Buffer 704 below. In this embodiment's first state, Reordering Buffer 704 holds three segments passed to it by the Upload Handler 703. Three segments happen to be the maximum number of segments this exemplar Reordering Buffer 704 holds. Presently stored in the Reordering Buffer 704 is a segment with an Upload ID of 4 ("Seg_UID_4"), a segment with an Upload ID of 5 ("Seg_UID_5") and a segment with Upload ID of 7 ("Seg_UID_7"). Previously, a consecutive segment was not received by the Upload Handler 703 between the receipt of Seg_UID_5 and Seg_UID_7. The segment with an Upload ID of 6 ("Seg_UID_6") 701 was received out-of-order, later in the sequence than it was created and posted.

In this embodiment's next state, that is shown at 704 below and 705, the segment with the lowest Upload ID presently in the Reordering Buffer (in this instance, Seg_UID_4) is moved out of the Reordering Buffer 704 and passed to the Broadcast Server 705 because the Reordering Buffer happens to be at its maximum capacity when it is being passed Seg_UID_6 701. Instead of being disregarded, Seg_UID_6 is stored in the Reordering Buffer 704. The Reordering Buffer 704 now holds a strictly increasing sequence of consecutive segments, Seg_UID_5, Seg_UID_6 and Seg_UID_7. These segments will be sent in the correct order as new segments are passed from the Upload Handler 703.

Referring to FIG. 8, the steps of one embodiment of the present invention's algorithm to allow for out-of-order segments to be broadcast in order is shown. The number of segments stored in the Reordering Buffer ("Segments Buffered") is set to zero 801. The maximum number of segments that may be stored in the Reordering Buffer ("Max Segments") is set to a maximum value 802.

As each posted segment and its associated Upload ID is received 803, Segments Buffered is incremented by one 804, and Segments Buffered is compared to Max Segments 805. If Segments Buffered is equal to Max Segments, the Segment with the lowest associated Upload ID is determined 806, that segment and its associated Upload ID are removed from the Reordering Buffer and passed to the Broadcast Server 807, and Segments Buffered is decremented by one 808.

If Segments Buffered is not equal to Max Segments, the next posted segment and its associated Upload ID is received 803.

In this way, a network-loss tolerant mobile broadcasting system rescues late-arriving segments while still preventing them from halting the playback of a live video stream.

What is claimed is:

1. A system comprising:
a video broadcast server; and
a computer with a memory and a processor, wherein the memory comprises executable instructions that, when executed by the processor, instructs the video broadcast server to perform operations which create and maintain a playlist of video segments in a manifest that addresses lost segments and addresses out-of-order segments, the operations including:
setting a Received Upload ID parameter to an initial numeric value;
setting a Max Upload ID parameter to an initial value equal to said Received Upload ID minus 1;
assigning an Out Of Order tag;
creating said manifest with an initial, empty state;
receiving a video segment and said video segment's associated Upload ID which were created and generated, respectively, by a video camera;
setting said Received Upload ID to a value equal to said video segment's associated Upload ID;
comparing said Received Upload ID to said Max Upload ID;
IF said Received Upload ID is equal to said Max Upload ID plus 1
THEN
assigning an identifier to said video segment;
appending said identifier to said manifest;
setting said Max Upload ID to said Received Upload ID;
allowing for management of said manifest;
returning to receiving video segments and their associated Upload IDs which were created and generated, respectively, by said video camera;
ELSE IF said Received Upload ID is less than said Max Upload ID
THEN
disregarding said video segment;
returning to receiving video segments and their associated Upload IDs which were created and generated, respectively, by said video camera;
ELSE
assigning an identifier to said video segment;
appending said Out Of Order tag to said manifest;
appending said identifier to said manifest;
setting said Max Upload ID to said Received Upload ID;
allowing for management of said manifest;
returning to receiving video segments and their associated Upload IDs which were created and generated, respectively, by said video camera;

such that lost video segments and out-of-order video segments do not interfere with the presentation of said playlist of video segments to viewing devices.

2. The system of claim 1, further comprising a reordering buffer manager, wherein said computer instructs the reordering buffer manager to perform operations which create and maintain a storage buffer that addresses late-arriving video segments from an upload handler, the operations including:
    setting a Segments Buffered parameter to an initial numeric value;
    setting a Max Segments parameter to a maximum value greater than said Segments Buffered;
    receiving a video segment and said video segment's associated Upload ID from said upload handler;
    storing said video segment and said video segment's associated Upload ID in said storage buffer;
    incrementing said Segments Buffered by 1;
    comparing said Segments Buffered to Max Segments;
    IF said Segments Buffered is equal to said Max Segments THEN
    determining which video segment in said storage buffer has the lowest associated Upload ID;
    transferring said video segment with lowest associated Upload ID from said storage buffer to said video broadcast server;
    decrementing said Segments Buffered by 1;
    returning to receiving video segments and their associated Upload IDs from said upload handler;
    ELSE
    returning to receiving video segments and their associated Upload IDs from said upload handler;
    such that late-arriving video segments are not disregarded and are sent to said video broadcast server in the order that said late-arriving video segments were captured by said video camera.

* * * * *